S. F. DAVIS.
SAW TOOTH FASTENING.
APPLICATION FILED JAN. 22, 1910.
971,732.
Patented Oct. 4, 1910.
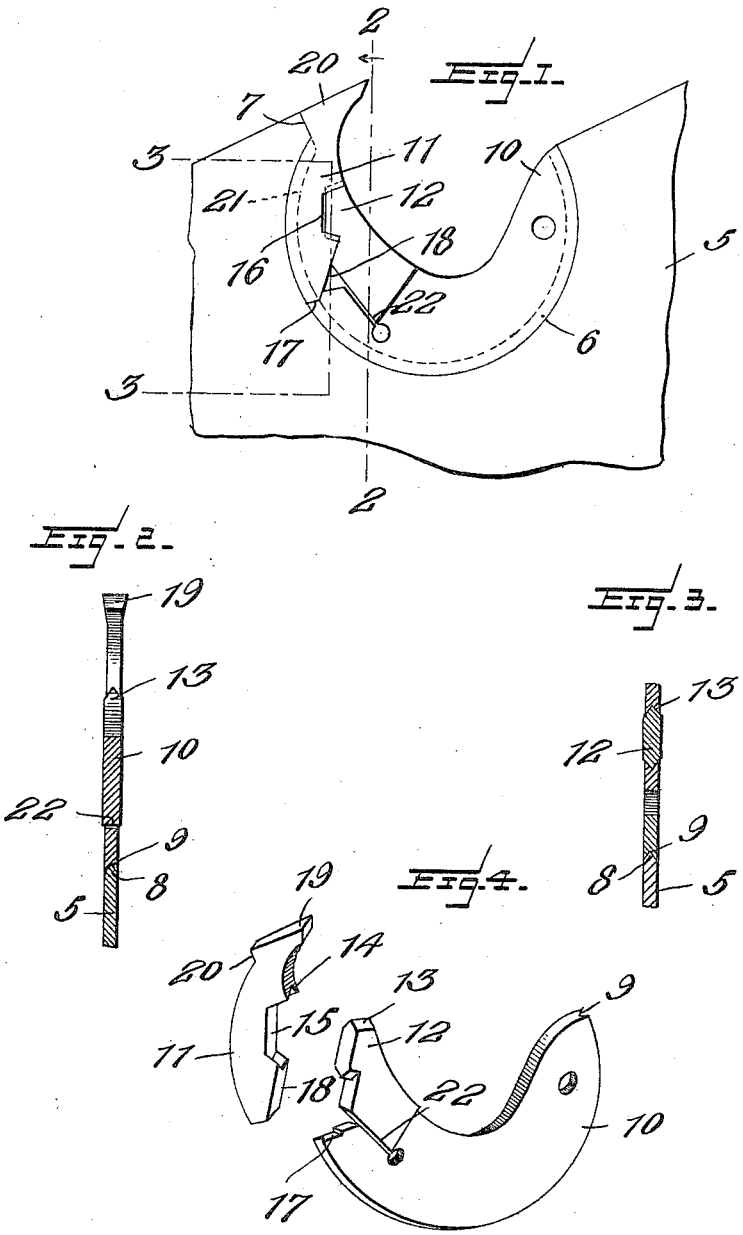
Witnesses
Chas. L. Griestauer.
E. M. Ricketts
Inventor
S. F. Davis.
By Watson E. Coleman
Attorney

UNITED STATES PATENT OFFICE.

SAMUEL F. DAVIS, OF CLEARMONT, MISSOURI.

SAW-TOOTH FASTENING.

971,732. Specification of Letters Patent. Patented Oct. 4, 1910.

Application filed January 22, 1910. Serial No. 539,491.

*To all whom it may concern:*

Be it known that I, SAMUEL F. DAVIS, a citizen of the United States, risiding at Clearmont, in the county of Nodaway and State of Missouri, have invented certain new and useful Improvements in Saw-Tooth Fastenings, of which the following is a specification, reference being had to the accompanying drawings.

This invention relates to certain new and useful improvements in detachable or insertible saw teeth and has for its object to simplify and improve the construction of such devices, whereby the maximum of strength and rigidity of the tooth when secured in the saw plate is obtained.

Another object is to provide a tooth and holding member therefor adapted to be interlocked and seated in a recess provided for the reception of said tooth and holding member in the saw plate whereby the release of the tooth in the operation of the saw is rendered impossible.

With these and other objects in view, the invention consists of the novel features of construction and the combination and arrangement of parts hereinafter fully described and claimed, and illustrated in the accompanying drawings, in which—

Figure 1 is a side elevation of a section of a saw showing my improved detachable tooth inserted therein; Fig. 2 is a section taken on the line 2—2 of Fig. 1; Fig. 3 is a section taken on the line 3—3 of Fig. 1; and Fig. 4 is a detail perspective view of the tooth and holding plate removed from the saw.

Referring more particularly to the drawings 5 indicates the saw plate. This plate is provided in its edge with a plurality of recesses 6, the edge of said recesses describing a continuous arc comprising the greater part of a circle, and one end of the edge of these recesses terminates at a point inwardly of the edge of the saw plate, whereby a shoulder 7 is provided. The edge of the plate 5 bounding the recess is provided with the usual outwardly extending V-shaped rib or tongue 8 which is adapted to be received in the similarly shaped groove or gullet 9 of a holding or locking plate 10 which is disposed within the recess of the saw plate. This locking plate is of segmental form and does not entirely fill the recess in the saw plate but terminates upon one side of said recess inwardly of the outer edge of the saw. A space is thus provided between the end of the locking plate and the edge of the recess to receive the insertible tooth 11. The end of the locking plate 10 against which the tooth 11 abuts is formed with a lug or projection 12, the ends of which are angularly disposed in convergent relation and are of V-shaped form, as shown at 13, for engagement in the V-shaped grooved ends 14 of a recess 15 provided in the inner edge of the insertible saw tooth 11. This recess is of substantially the same form as the extension 12, but of slightly greater depth whereby a space 16 is left between the opposed edges of the recess and extension when the tooth is locked in the saw plate. The inner end of the tooth 11 abuts against a shoulder 17 formed on the end of the locking plate 10, as clearly shown in Fig. 1, and the remaining edge portion 18 of the tooth is disposed in spaced relation to the opposed end portion of the locking plate 10. The point of the tooth 11 is expanded or swaged in the usual manner, as shown at 19, so that a kerf of sufficient width will be formed in the operation of the saw to prevent binding of the edges of the material upon the sides of the saw plate. The other end of the point of the tooth provides a shoulder 20 which is adapted to abut against the shoulder 7 of the saw plate whereby a stop is provided to prevent inward movement of the tooth when pressure is brought to bear thereon. The outer edge of the insertible tooth 11 between the shoulder 20 and the inner end thereof is formed with a V-shaped groove 21 similar to that in the locking plate 10 to receive the V-shaped tongue 8 extending into the recess 6 of the saw plate.

The locking plate 10 is provided with the usual slot and opening 22 therethrough between its outer and inner edges to compensate for the expansion of the metal. Owing to the great amount of wear upon the grooves 9 and 21 of the locking plate 10 and the tooth 11 caused by the removal and insertion of these elements, the efficiency of the device is greatly impaired as the proper locking action of the plate 10 upon the saw tooth cannot be secured. To obviate this difficulty I preferably form that portion of the locking plate between the inner end of the slot 22 and the extension 12 slightly heavier than the remaining portion thereof to permit of its expansion or distention so as to compensate for the wear incident to the insertion and removal of the tooth, as above described.

It will be obvious that when the saw is in use, the larger part of the pressure upon the tooth will be brought to bear upon the tongue and groove connections 13 and 14 between the locking plate and the tooth 11, there being no pressure upon the outer edge of the extension 12 and the opposed inner edge of the tooth. Owing to the angular position of the shoulder 7, the tooth will tend to move inwardly, thus causing increased pressure upon the projection 12 of the plate 10. Thus the pressure upon the tooth is in a direction crosswise of the plate of the saw and as the other end of the locking plate 10 extends a considerable distance beyond the center of said plate, the possibility of the locking plate being forced out of the recess in the saw plate is obviated. The V-shaped tongue and groove connection of the parts will also obviate the liability of lateral displacement of the saw tooth and locking plate.

From the foregoing it is believed that the operation and many advantages of my invention will be readily understood without necessitating a more extended description. The insertible tooth is very rigidly held in the saw plate and is as efficient in use as the ordinary saw wherein the teeth thereof are formed integral with the plate. The tooth may be very quickly inserted or removed, and avoids the necessity of the user purchasing an entire new saw when one of the teeth is so badly broken or damaged as to obviate its further use. Moreover, the device is very simple in construction, inexpensive to manufacture, and strong, durable and highly efficient in operation.

While I have shown and described what I believe to be the preferable form of the invention, it will be obvious that various minor modifications may be resorted to without materially departing from the spirit or sacrificing any of the advantages thereof.

Having thus described the invention what is claimed is:

In combination, a saw plate having a recess describing the greater part of a circle, a V-shaped tongue extending into said recess from the edge thereof, the edge of said saw plate at one side of the entrance of said recess being shouldered, a segmental locking plate arranged within said recess, having a peripheral groove to receive said tongue, one end of said locking plate having an extension formed thereon spaced from the edge of the recess in the saw plate, said extension being of greater thickness than the locking plate and having its ends beveled, a detachable saw tooth adapted to be arranged between the end of the locking plate and the edge of the recess, said tooth having a recess in one edge to receive the extension on the locking plate, the ends of said recess being grooved to receive the beveled ends of the extension, the body of the locking plate opposite to the extension thereof, being extended beyond said extension to provide a shoulder against which the end of the tooth abuts, the recess in said tooth which receives the extension having its base edge spaced from the end of the extension, and a shoulder formed on said tooth at one end of the point thereof adapted for engagement upon the shoulder on the outer edge of the saw plate, substantially as and for the purpose set forth.

In testimony whereof I hereunto affix my signature in the presence of two witnesses.

SAMUEL F. DAVIS.

Witnesses:
WILLARD G. CARPENTER,
HENRY WEHEN.